United States Patent
Baik et al.

(10) Patent No.: US 7,149,669 B2
(45) Date of Patent: Dec. 12, 2006

(54) MODELING METHOD FOR A VEHICLE STEERING SYSTEM

(75) Inventors: Sung-Shik Baik, Seoul (KR); Sang-Heon Song, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 800 days.

(21) Appl. No.: 10/329,147

(22) Filed: Dec. 23, 2002

(65) Prior Publication Data

US 2003/0120469 A1   Jun. 26, 2003

(30) Foreign Application Priority Data

Dec. 24, 2001   (KR) .............................. 2001-83971

(51) Int. Cl.
  *G06G 7/48*   (2006.01)
  *B62D 1/11*   (2006.01)
  *B62D 1/18*   (2006.01)
  *B62D 1/19*   (2006.01)

(52) U.S. Cl. ............................. 703/7; 703/8; 280/777

(58) Field of Classification Search .................... 703/7, 703/8; 280/777
  See application file for complete search history.

(56) References Cited

U.S. PATENT DOCUMENTS

| | | | |
|---|---|---|---|
| 4,327,517 A | 5/1982 | Schwager | |
| 4,718,685 A | 1/1988 | Kawabe et al. | |
| 4,840,389 A | 6/1989 | Kawabe et al. | |
| 5,249,151 A * | 9/1993 | Chang et al. | 703/7 |
| 5,253,189 A * | 10/1993 | Kramer | 703/7 |
| 5,366,042 A | 11/1994 | Wilks et al. | |
| 5,547,383 A | 8/1996 | Yamaguchi | |
| 5,657,545 A * | 8/1997 | Haworth et al. | 33/1 N |
| 5,803,202 A | 9/1998 | Bohner et al. | |
| 5,868,573 A | 2/1999 | Kerby et al. | |
| 6,109,652 A * | 8/2000 | Kim et al. | 280/777 |
| 6,134,957 A | 10/2000 | Fricke et al. | |
| 6,917,907 B1 * | 7/2005 | Hsi et al. | 703/8 |

OTHER PUBLICATIONS

"ADAMS/Car Training Guide" Version 11.0, Part No. 110CARTRG-02, Jul. 17, 2001, 262 pages.*

* cited by examiner

*Primary Examiner*—Paul Rodriguez
*Assistant Examiner*—Dwin McTaggart Craig
(74) *Attorney, Agent, or Firm*—Morgan Lewis & Bockius LLP

(57) ABSTRACT

A modeling method of a steering system for a vehicle comprises the steps of interpreting a coupled relation between an upper tube and a lower tube comprising a steering column, interpreting a coupled relation between the upper tube and an upper bracket and a coupled relation between the lower tube and a lower bracket, and interpreting the movement of a bearing mounted between a steering axle and a steering column using a cylindrical coordinate, thereby improving credibility relative to the interpretation result of a model When the interpretation result is applied to an actual vehicle, the impact absorption capacity and idle vibration capacity are greatly increased, thereby improving the performance of the overall steering system and ensuring safety to the occupants of the vehicle.

12 Claims, 8 Drawing Sheets

MODELING METHOD FOR A VEHICLE STEERING SYSTEM

FIELD OF THE INVENTION

The present invention relates to a modeling method for a vehicle steering system, and more particularly, to a method for constructing a model which functions substantially the same as that of an actual vehicle's steering system.

BACKGROUND OF THE INVENTION

When designing conventional steering systems, designers typically use simplified modeling techniques to simulate the steeling system. However, these modeling techniques lead to inaccurate representations of a vehicle's actual steering system. Therefore, a modeling technique that more accurately represents a real vehicle's steering system would be highly desirable.

SUMMARY OF THE INVENTION

The present invention provides a modeling method for a steering system for a vehicle adapted to substantially model and represent the movement of a steering system of an actual vehicle. Specifically the movement of the connecting structure of the upper/lower end tube, the movement of connecting structure of the steering column and the upper/lower bracket, and the movement of the bearing mounted between the steering axle and the steering column which comprise the steering system. This improves the credibility of results of the model of the steering system as compared to a steering system of an actual vehicle.

In accordance with an embodiment of the present invention, a modeling method of a steering system for a vehicle comprises the steps of representing the coupled relation between the upper tube and lower tube comprising the steering column, representing the coupled relation between the upper tube and an upper bracket and the coupled relation between the lower tube and lower bracket, and representing the movement of a bearing mounted between the steering axle and steering column using a cylindrical coordinate system.

According to the invention there is provided a method for modeling a vehicle steering system. A representation of a coupled relation between an upper tube and a lower tube of a steering column is generated. Also, a representation of a coupled relation between said upper tube and an upper bracket is generated. Subsequently, a representation of a coupled relation between said lower tube and a lower bracket is generated, and a representation of the movement of a bearing mounted between a steering axle and a steering column using a cylindrical coordinate system is generated. The upper tube and said lower tube are represented as being coupled to each other at spot couplings disposed at a plurality of areas along a circumferential direction of said upper tube and said lower tube. The plurality of areas are disposed where said upper tube and said lower tube overlap. Also, the upper and said lower tube are represented as being joined by way of a pair of spot couplings disposed every 90 degrees along the circumferential direction. Furthermore, the upper tube and an upper bracket are represented as being joined by way of a plurality of surface couplings along the circumferential surface of said upper tube. The lower tube and said lower bracket are represented as being joined by way of a plurality of spot couplings along the circumferential surface of said lower tube. When a spring value of said bearing disposed between said steering axle and said steering column is represented using the cylindrical coordinate system, axial spring values of said bearing and circumferential spring values of said bearing are set up to have mutually different values. Also, the circumferential spring values of said bearing are set up to be evenly distributed from the center of said steering axle to the circumferential direction of said steering column, up to as many as a number of springs established at a time of modeling. The circumferential spring value of said bearing is defined as being proportional to a horizontal component of a force relative to the external force applied to a circumferential direction of said steering column, but inversely proportional to an angle formed between a component of a force and the circumferential direction. Also, the axial spring value of the bearing is proportional to the component of a force relative to an external force applied to a center of said steering column, but in inversely proportional a number of springs mounted along a central axis of the steering column.

BRIEF DESCRIPTION OF THE DRAWINGS

For fuller understanding of the invention, reference should be made to the following detailed description taken in conjunction with the accompanying drawings in which.

Throughout the drawings, like reference numerals and symbols are used for designation of like or equivalent parts or portions for simplicity of illustration and explanation.

DETAILED DESCRIPTION OF THE INVENTION

Figure 1:
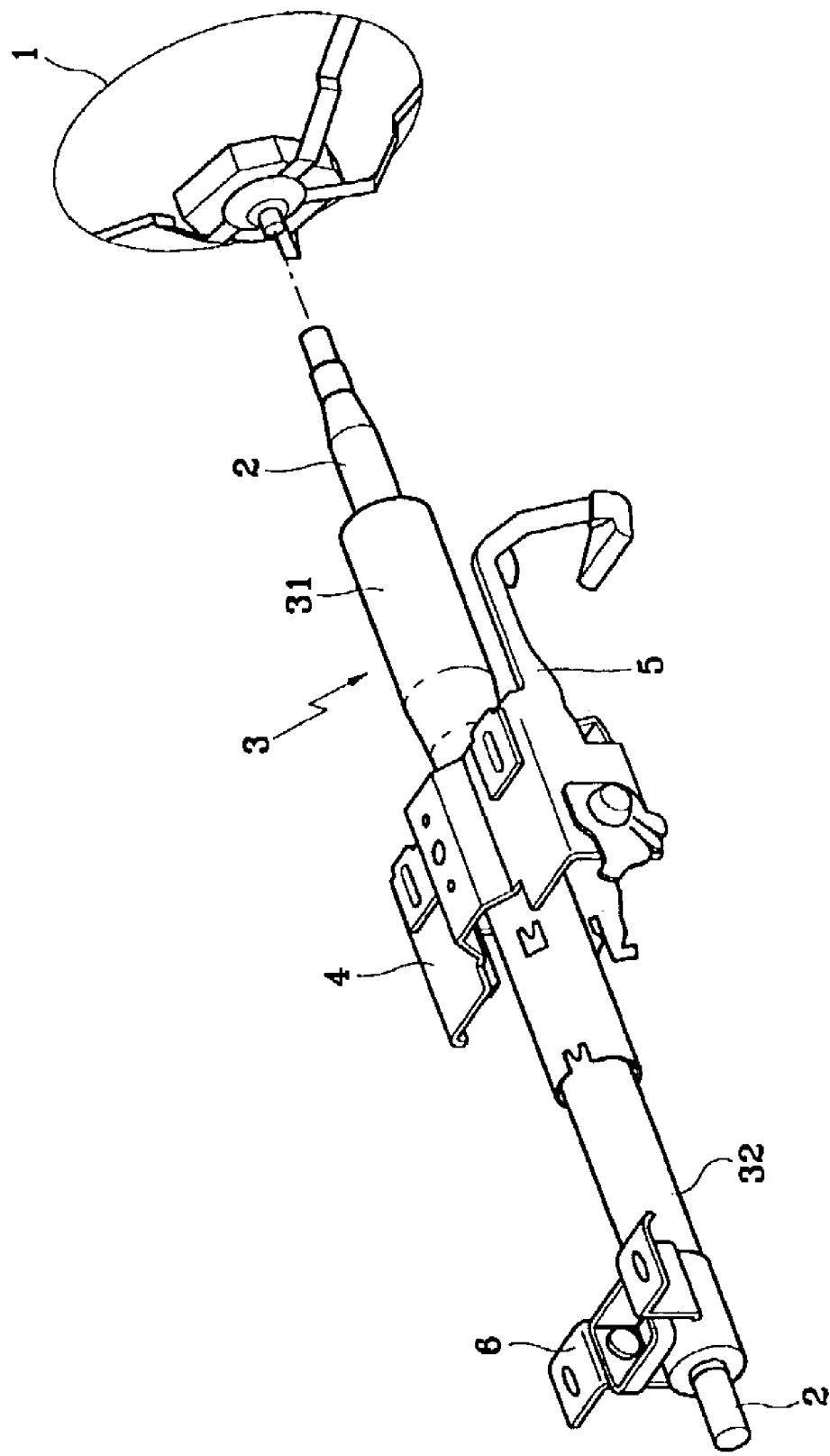
FIG. 1 is a perspective view illustrating a steering system.

A steering system, as shown in FIG. 1, includes a manipulating mechanism comprising a steering wheel 1 directly manipulated by a driver for transmitting a manipulating force generated therefrom to each mechanism, such as a steering axle 2, a steering column 3, or the like. The steering system also includes a gear mechanism for decelerating the rotation of the steering axle 2, to increase the manipulating force, and to simultaneously switch the direction of the manipulating mechanism to transmit the manipulating force to a link mechanism. The link mechanism includes a steering gear box, a tie rod, a knuckle arm, or the like for transmitting movement of the gear mechanism to front wheels and for simultaneously maintaining the positions of the left/right wheels.

The steering column 3, is typically a tube encompassing the steering axle 2 for absorbing shock and includes an upper tube 31 encompassing an upper peripheral surface of the steering axle 2 and a lower tube 32 inserted into and coupled to the upper tube 31 for encompassing a lower circumferential surface of the steering axle 2. The upper tube 31 is coupled to a pre-shaped upper bracket 4, which in turn is coupled to a tilt lever 5 for adjusting the angle of the steering wheel (not shown). The lower tube 32 is coupled to a pre-shaped lower bracket 6. The upper bracket 4 is coupled by a bolt and a mounting plate which is equipped at a cowl cross member (not shown).

Figure 2:
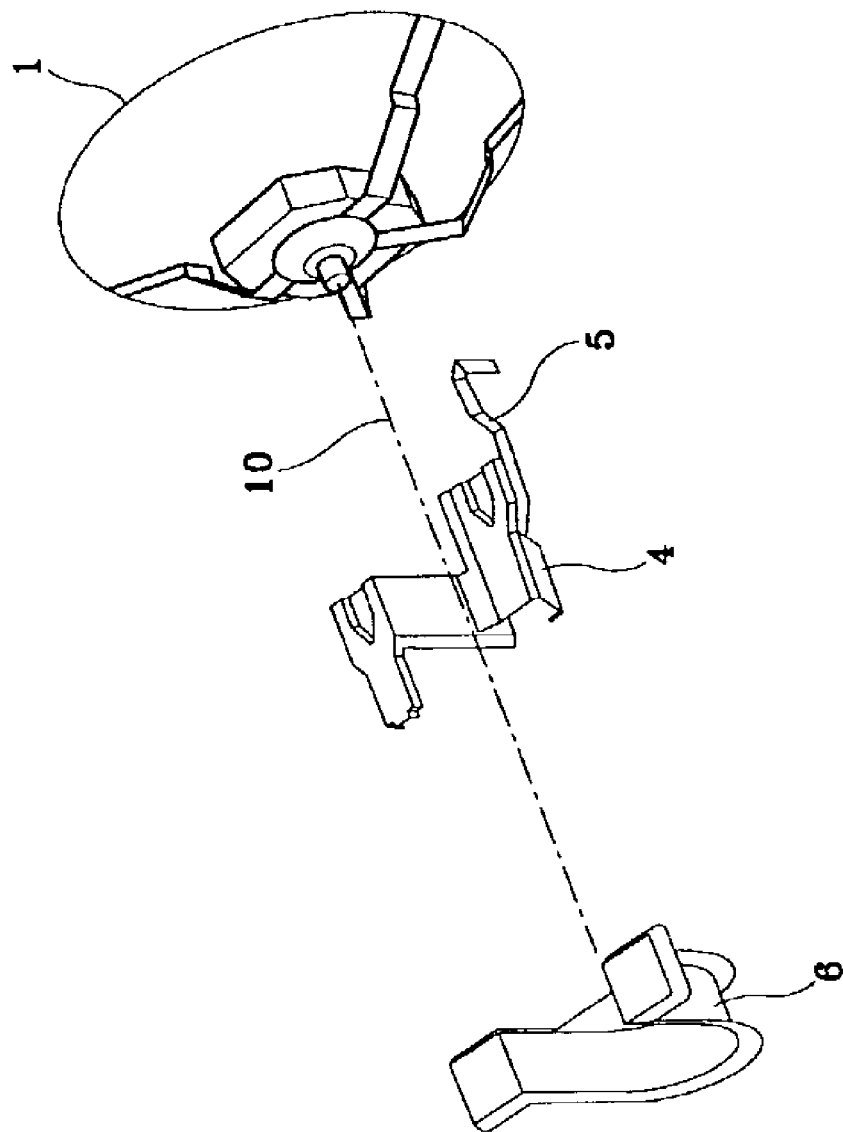
FIGS. 2 to 5 are representation drawings illustrating a modeling method.

The steering system thus constructed is designed for real vehicles using modeling techniques so that most suitable functions can be incorporated into the steering system for a particular type of vehicle. As illustrated in FIG. 2, a steering system model is representatively modeled after a standard body 10, which simplifies and integrates the steering axle 2, the upper tube 31 and the lower tube 32 of FIG. 1.

It is advantageous to interpret a steering system model modeled after the standard body 10, which integrally simplifies the steering axle 2, the upper tube 31 and the lower tube 32, thus described, in that the computing time of a computer (CPU) for representing the model can be drastically reduced. However, it is disadvantageous in that the connection structure between the upper and lower tube 31 and 32, the connection structure between the upper and lower bracket 4 and 6, and the movement of bearing 7 mounted between the steering axle 2 and the steering column 3 deviate greatly from the steering system of an actual vehicle. This brings about a decreased credibility of the representational results of the model.

Figure 3:
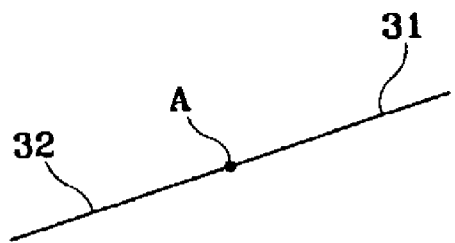

The connection structure applied to an actual vehicle between the upper tube 31 and the lower tube 32 peripherally has a plurality of support points and are intercoupled therebetween. However, this modeling representation method, is disadvantageous in that the upper tube 31 and the lower tube 32 are represented as coupling at one point (A), as illustrated in FIG. 3. This markedly increases the strength compared with that of the structure of an actual vehicle, thereby greatly decreasing the shock absorption capacity of the upper and lower end tube 31 and 32 and the idle vibration absorption capacity.

Figure 4:
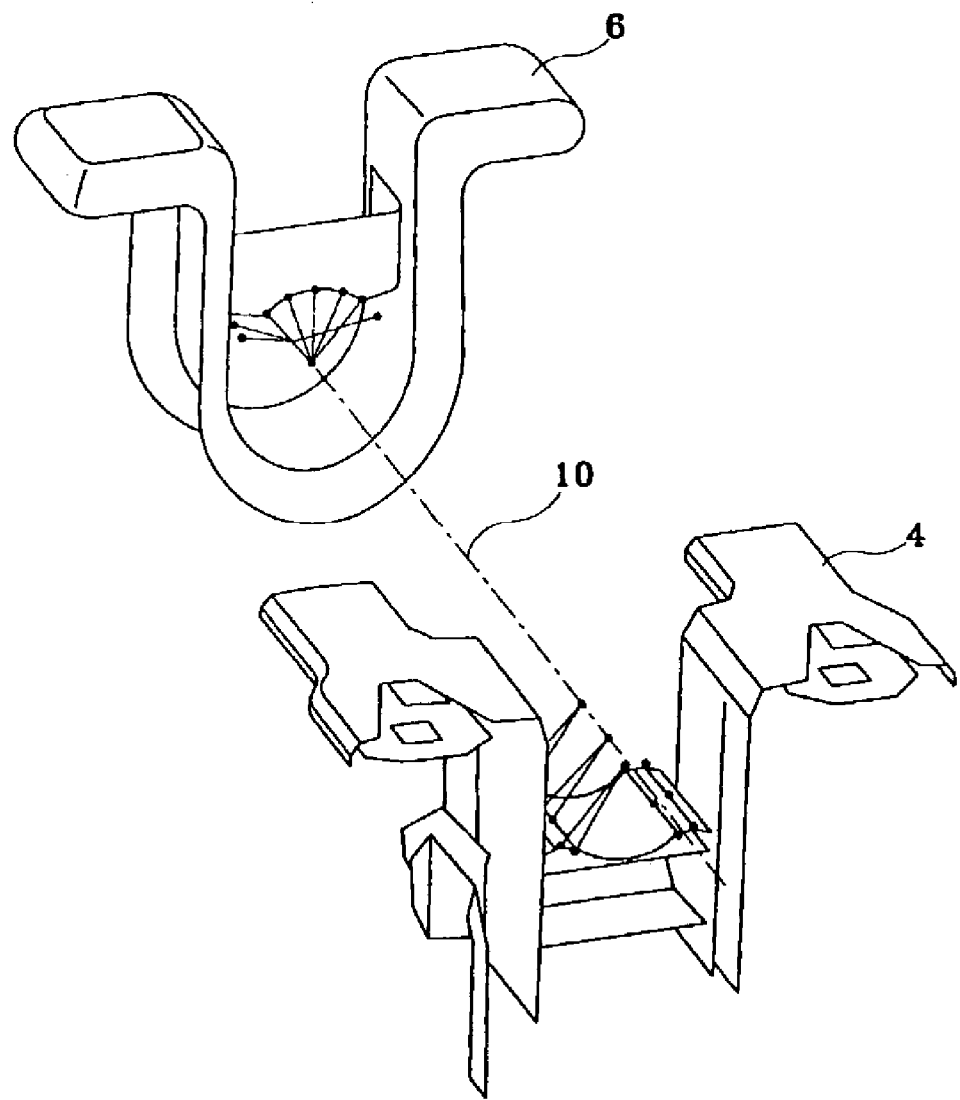

In an actual vehicle, the connection structure between the steering column 3 and the upper and lower bracket 4 and 6 is disposed such that the steering column 3 passes through the upper and lower bracket 4 and 6 to be supported at several points around the circumferential surface. However, in this modeling representation method utilizing the standard body 10 as illustrated in FIG. 4, there is a disadvantage in that the connection between the standard body 10 and the upper/lower brackets 4 and 6 is so excessively connected compared with that of an actual vehicle, such that a representation is made that greatly decreases the shock absorption capacity and the idle vibration absorption capacity of the steering column 3.

Figure 5:
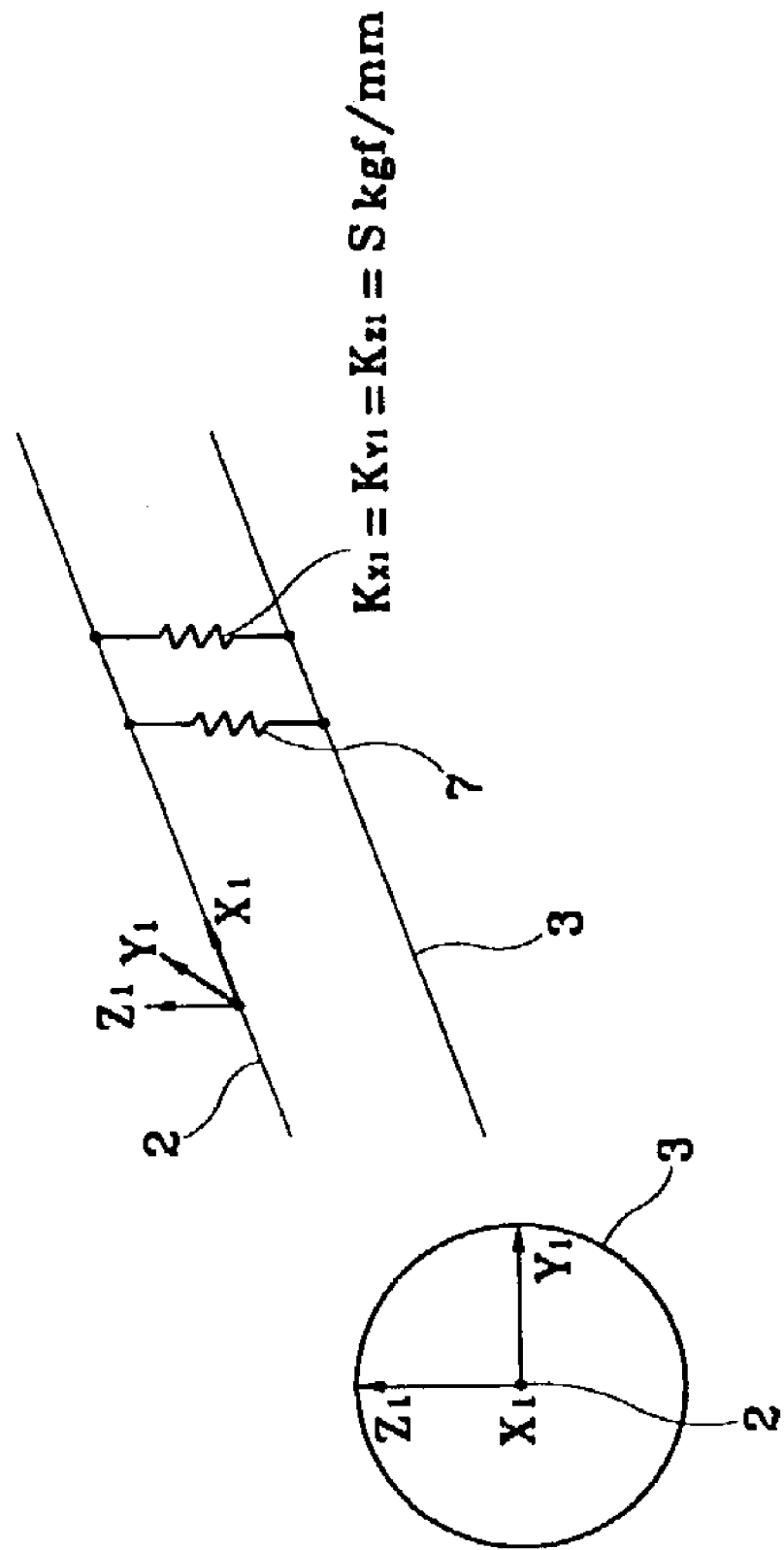

When the movement of bearing 7 mounted between the steering axle 2 and the steering column 3 is illustrated on a rectangular coordinate per FIG. 5 according to the conventional modeling representation method using the standard body 10, an axial spring value (Kx1) and circumferential spring values (Ky1 and Kz1) of the bearing 7 are all interpreted as the same value. This is disadvantageous as the movement of the bearing 7 is different to that of an actual vehicle. When the steering axle 2 is applied to an actual vehicle using the interpretation value thus obtained, the steering performance of the steering system is drastically reduced.

Although the axial spring value (Kx1) and circumferential spring values (Ky1 and Kz1) of the bearing 7 differ according to the type of vehicle, a same value of Skgf/mm is generally given for a passenger car, where S is a constant for the spring value of a bearing.

FIGS. 6 to 11 are representation drawings for illustrating the modeling method according to the present invention. The modeling method of a steering system according to the present invention uses modeling and representation methods similar to a real vehicle's steering system, especially in modeling the connecting structure of the upper/lower tubes of the steering system, the connecting structure between the steering column and the upper/lower bracket, and the bearing mounted between the steering axle and the steering column.

Figure 6:
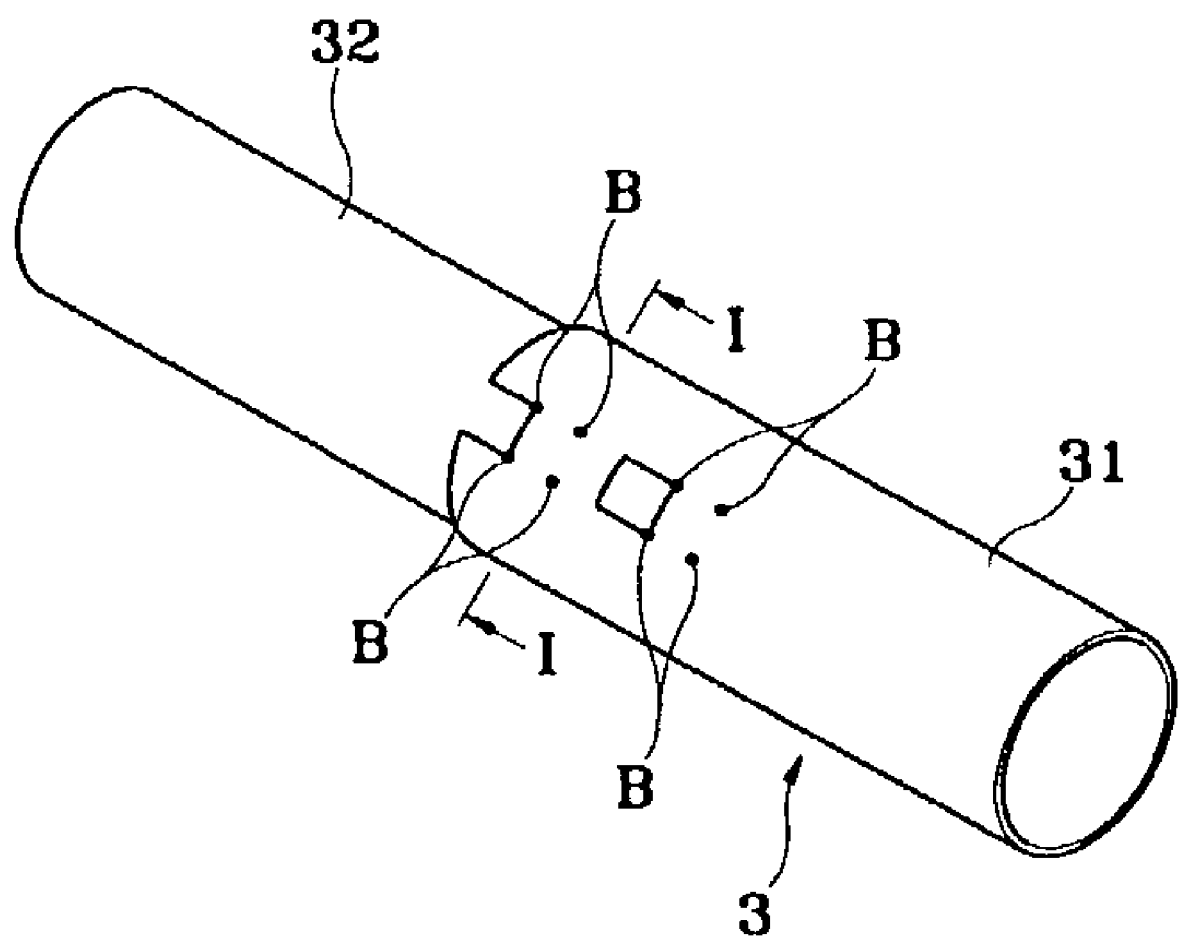
FIGS. 6 to 11 are representation drawings illustrating a modeling method according to the present invention.
Figure 7:
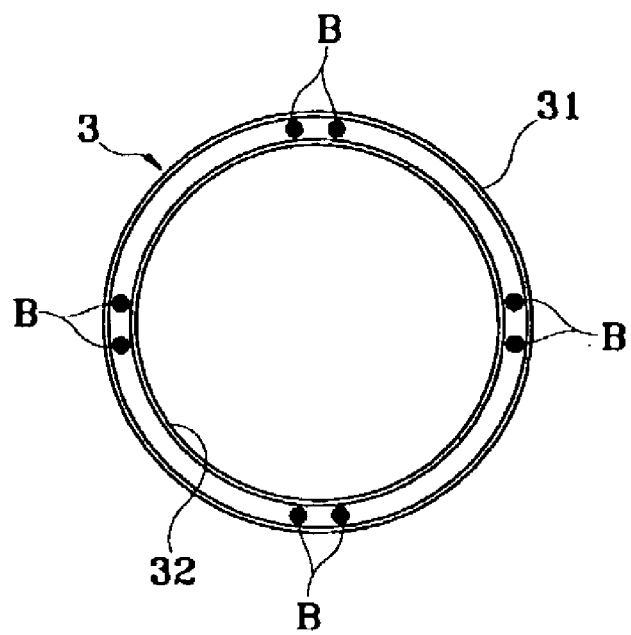

As illustrated in FIGS. 6 and 7, the upper tube 31 and the lower tube 32 are coupled via spot couplings (B) disposed in a plurality of areas along the circumference of the tubes where both tubes 31 and 32 overlap. The pair of spot couplings (B) are preferably disposed equidistantly along the circumference of the tubes at 90 degree coordinates.

Figure 8:
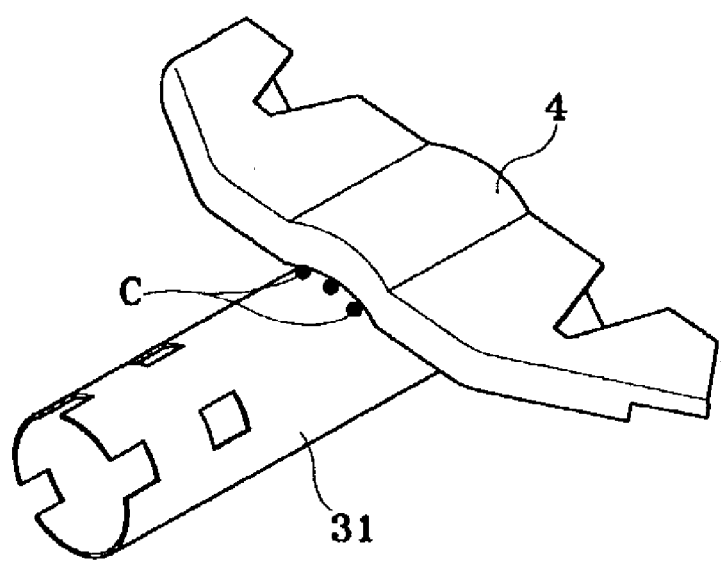
Figure 9:
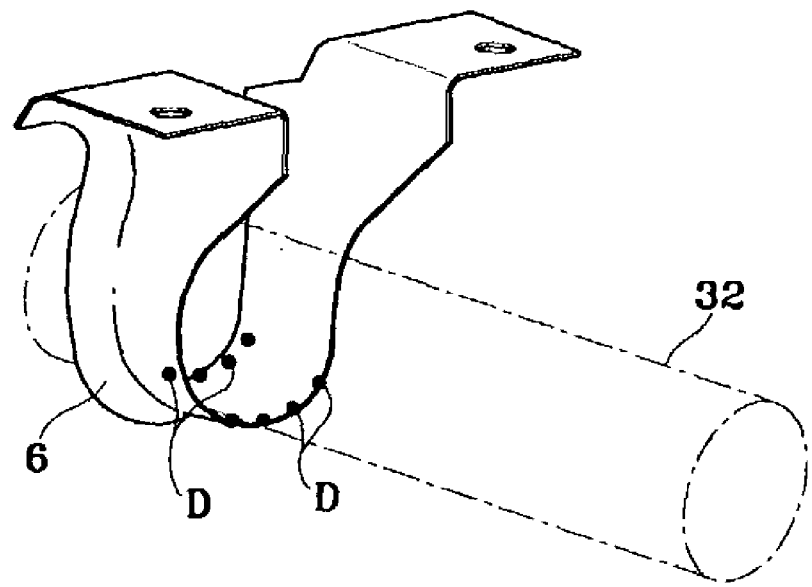
Figure 10:
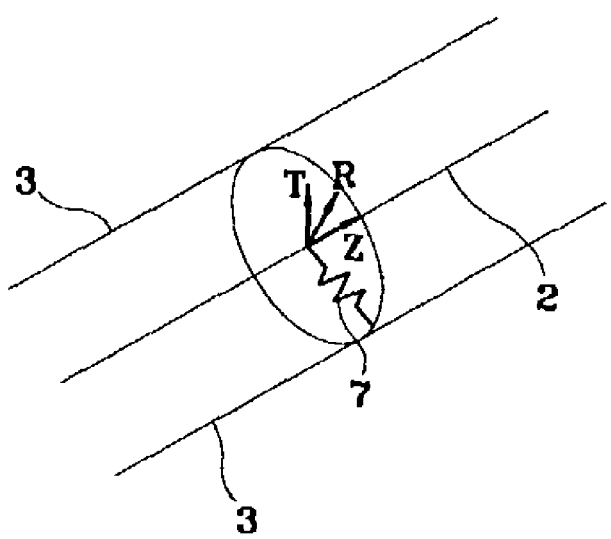
Figure 11:
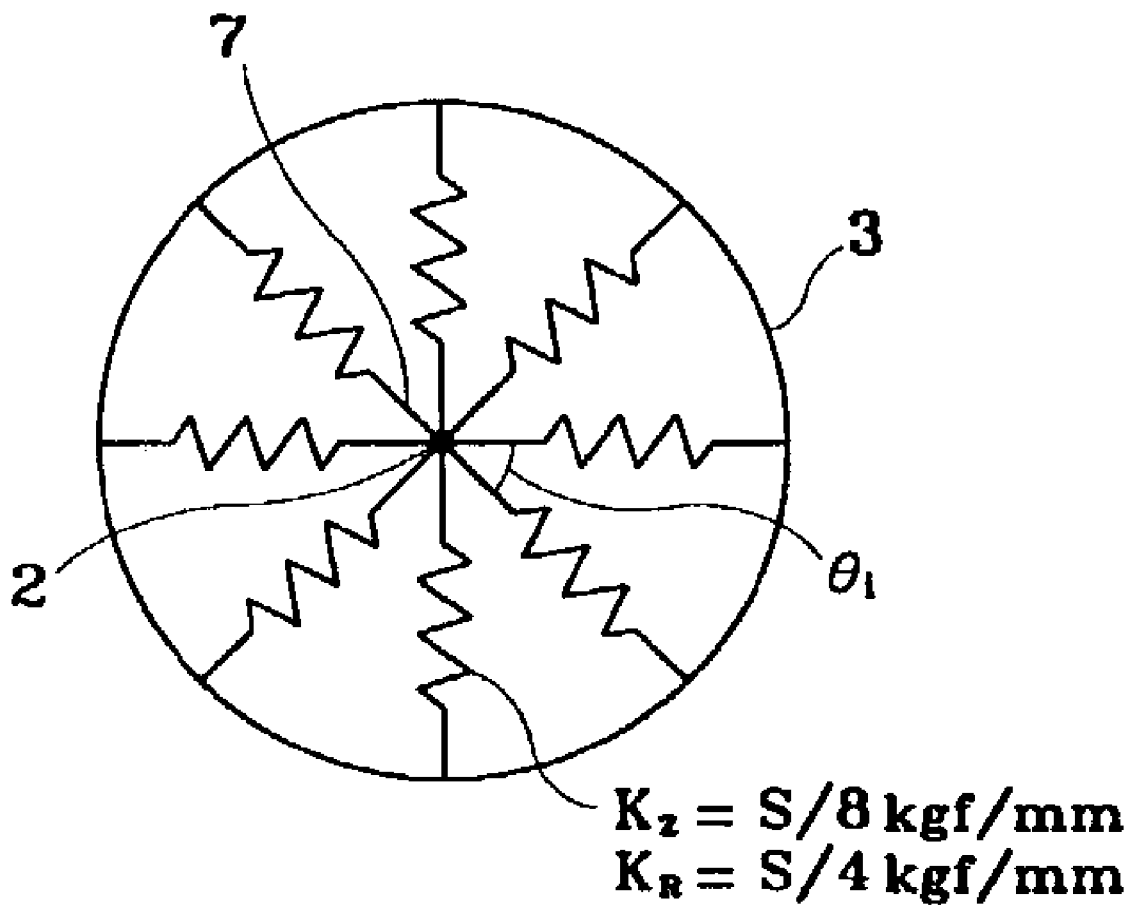

As illustrated in FIG. 8, the upper tube 31 and the upper bracket 4 are joined by way of a plurality of surface couplings (C) disposed along the circumferential surface of the upper tube 31, thereby forming mutual surface contacts. The lower tube 32 and the lower bracket 6 are joined, as illustrated in FIG. 9, by way of a plurality of spot couplings (D) disposed along the circumferential surface of the lower tube 32 forming mutual surface contacts. When the spring value of the bearing 7 disposed between the steering axle 2 and the steering column 3 is interpreted using the cylindrical coordinate as per FIGS. 10 and 11, the axial spring values (Kz) of the bearing 7 and circumferential spring values (KR) of the bearing 7 are set up to have mutually different values. The circumferential spring values (KR) of the bearing 7 are set up to be evenly distributed from the center of the steering axle 2 to the circumferential direction of the steering column up to as many as the number of the springs established at the time of modeling. The axial spring value (Kz) of the bearing 7 is interpreted by the value of (S/8) kgf/mm while the circumferential spring value (KR) of the bearing 7 is interpreted by the value of (S/4) kgf/mm, where S is a constant representing a spring value of the bearing.

The circumferential spring value (KR) of the bearing 7 is determined by the following Formula 1.

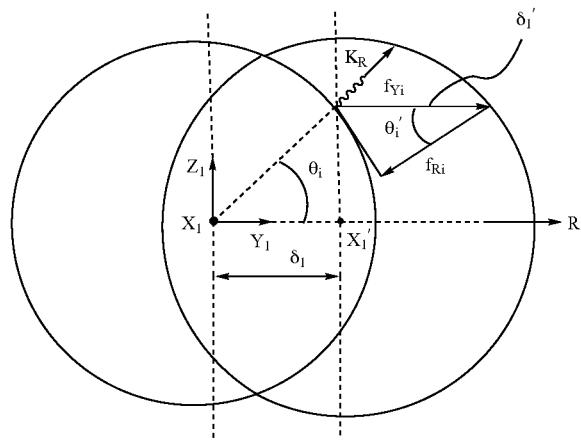

FORMULA 1

① $f_{Ri} = K_R \cdot \delta'_1 \, \mathrm{Cos}\theta'_i$

② $f_{Yi} = f_{Ri} \cdot \mathrm{Cos}\theta'_i = K_R \cdot \delta'_1 \cdot \mathrm{Cos}^2\theta'_i$의 때, ③ $K_{YI} \cdot \delta_1 = \sum_{i=1}^{N} f_{Yi} = \sum_{i=1}^{N} K_R \cdot \delta'_1 \cdot \mathrm{Cos}^2\theta'_i (\delta_1 = \delta'_1)$ $\therefore K_R = \dfrac{K_{YI}}{\sum_{i=1}^{N} \mathrm{Cos}^2\theta'_i}$ $\therefore \theta'_i = \dfrac{2\pi}{N} \cdot i$ Where, fRi and fYi are forces applied to the circumferential direction of the bearing 7 when the steering axle 2 in the cylindrical coordinate is moved (X1 to X1') as much as a preset deviation (δ) toward the circumferential direction of the steering column by an external force and KR is a circumferential strength value, while N is the number of springs set up at the time of modeling from the center of the steering axle 2 to the circumferential direction of the steering column.

The circumferential spring value (KR) of the bearing 7 is defined as being in proportion to the horizontal component of a force (KY1) relative to the external force applied to the circumferential direction of the steering column 3, but in inverse proportion to an angle ($\theta_i^t$) formed between the component of a force (KY1) and the circumferential direction.

The axial spring value (KZ) of the bearing 7 is determined by the following Formula 2.

FORMULA 2

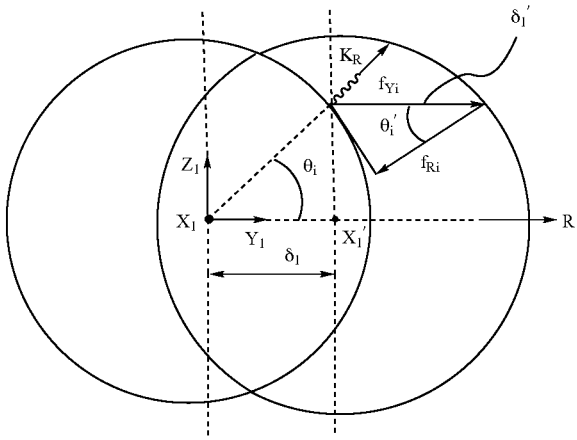

$$\therefore K_z = \frac{K_{x1}}{N}$$

N refers to the number of springs established at the time of modeling from the center of the steering axle 2 to the circumferential direction of the steering column 3.

The axial spring value (KZ) of the bearing 7 is defined to be proportional to the component of a force (Kx1) relative to the external force applied to the center (X1) of the steering column 3, but in inverse proportion with the number (N) of the springs mounted along the central axis of the steering column 3.

In the modeling of a steering system, when representation is itemized in detail against the movement of the connecting structure between the upper/lower end tube 31 and 32, the movement of the connecting structure between the steering column 3 and the upper/lower bracket 4, and the movement of the bearing mounted between the steering axle 2 and the steering column 3, which comprise the steering system, a representation result almost identical to the operation state of the steering system applied to a real vehicle can be obtained. This improves credibility relative to the representational result of a model and performance of an actual vehicle's steering system. The upper tube 31 and the lower tube 32 are represented to have almost the same strength as that of an actual vehicle, whereby the impact absorption capacity and idle vibration capacity of the upper/lower tube 31 and 32 are greatly increased, thereby improving the performance of the steering system.

When the coupling between the upper tube 31 and the upper bracket 4 and the coupling between the lower tube 32 and the lower bracket 6 are set up to form a plurality of spot couplings (C and D) at areas where the couplings are surface-contacted according to the modeling method of the present invention, the coupling between the upper tube 31 and upper bracket 4 and the coupling between the lower tube 32 and the lower bracket 6 are represented as having almost the same strength as that of an actual vehicle. Therefore, when applied to an actual vehicle, the impact absorption capacity and the idle vibration absorption capacity are greatly increased, thereby improving the performance of the overall steering system.

When the spring value of the bearing 7 disposed between the steering axle 2 and the steering column 3 is represented using the cylindrical coordinate according to the modeling method of the present invention, the axial spring value (Kz) of the bearing 7 and the circumferential spring value (KR) of the bearing 7 are set up to have mutually different values and the circumferential spring values (KR) of the bearing 7 are set up to have even distributions along the circumferential direction of the steering column 3 from the center of the steering axle 3 up to as many as the number of the springs established at the time of the modeling. This enables a similar representation value to those of the movements of the bearing 7 of a real vehicle. When the interpretation values thus described are used and applied to a real vehicle, the manipulating performance of the entire steering system is markedly improved to ensure the safety of the vehicle.

As apparent from the foregoing, the modeling method of a steering system for a vehicle according to the present invention is advantageous in that in the modeling of a steering system, interpretation is itemized in detail against the movement of the connecting structure between the upper/lower end tube, the movement of connecting structure between the steering column and the upper/lower bracket, and the movement of the bearing mounted between the steering axle and the steering column. This improves the credibility of the representation of the model, and when the representation result is applied to an actual vehicle, the impact absorption capacity and idle vibration capacity are greatly increased, thereby improving the performance of the overall steering system and ensuring safety to the occupants of the vehicle.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A modeling method of a steering system for a vehicle, the method comprising the steps of:
   representing a coupled relation between an upper tube and a lower tube of a steering column;

representing said coupled relation between said upper tube and an upper bracket, and a coupled relation between said lower tube and a lower bracket; and representing the movement of a bearing mounted between a steering axle and a steering column using a cylindrical coordinate system;

wherein, when a spring value of said bearing disposed between said steering axle and said steering column is interpreted using the cylindrical coordinate system, axial spring values of said bearing and circumferential spring values of said bearing are set up to have mutually different values and the circumferential spring values of said bearing are set up to be evenly distributed from the center of said steering axle to the circumferential direction of said steering column, up to as many as a number of springs established at a time of modeling.

2. The method as defined in claim 1, wherein said upper tube and said lower tube are set up to form spot couplings at a plurality of areas along a circumferential direction, the areas being where the tubes overlap.

3. The method as defined in claim 2, wherein said upper and said lower tube are joined by way of a pair of spot couplings about every 90 degrees along the circumferential direction.

4. The method as defined in claim 1, wherein said upper tube and an upper bracket are joined by way of a plurality of surface couplings along the circumferential surface of said upper tube, while said lower tube and said lower bracket are joined by way of a plurality of spot couplings along the circumferential surface of said lower tube.

5. The method as defined in claim 1, wherein the circumferential spring value of said bearing is defined as being in proportion to a horizontal component of a force relative to the external force applied to a circumferential direction of said steering column, but in inverse proportion to an angle formed between a component of a force and the circumferential direction.

6. The method as defined in claim 1, wherein the axial spring value of the bearing is proportional to the component of a force relative to an external force applied to a center of said steering column, but inversely proportional to a number of springs mounted along a central axis of the steering column.

7. A method for modeling a vehicle steering system, comprising:

generating a representation of a coupled relation between an upper tube and a lower tube of a steering column;

generating a representation of a coupled relation between said upper tube and an upper bracket;

generating a representation of a coupled relation between said lower tube and a lower bracket; and generating a representation of the movement of a bearing mounted between a steering axle and a steering column using a cylindrical coordinate system;

wherein, when a spring value of said bearing disposed between said steering axle and said steering column is represented using the cylindrical coordinate system, axial spring values of said bearing and circumferential spring values of said bearing are set up to have mutually different values, and the circumferential spring values of said bearing are set up to be evenly distributed from the center of said steering axle to the circumferential direction of said steering column, up to as many as a number of springs established at a time of modeling.

8. The method of claim 7, wherein said upper tube and said lower tube are represented as being coupled to each other at spot couplings disposed at a plurality of areas along a circumferential direction of said upper tube and said lower tube, where said plurality of areas are disposed where said upper tube and said lower tube overlap.

9. The method as defined in claim 8, wherein said upper and said lower tube are represented as being joined by way of a pair of spot couplings disposed about every 90 degrees along the circumferential direction.

10. The method as defined in claim 7, wherein said upper tube and an upper bracket are represented as being joined by way of a plurality of surface couplings along the circumferential surface of said upper tube, while said lower tube and said lower bracket are represented as being joined by way of a plurality of spot couplings along the circumferential surface of said lower tube.

11. The method as defined in claim 7, wherein the circumferential spring value of said bearing is defined as being proportional to a horizontal component of a force relative to the external force applied to a circumferential direction of said steering column, but inversely proportional to an angle formed between a component of a force and the circumferential direction.

12. The method as defined in claim 7, wherein the axial spring value of the bearing is proportional to the component of a force relative to an external force applied to a center of said steering column, but in inversely proportional a number of springs mounted along a central axis of the steering column.

* * * * *